United States Patent [19]

Hardwicke et al.

[11] 4,214,792
[45] Jul. 29, 1980

[54] WHEEL ADAPTER

[76] Inventors: Robert L. Hardwicke, 929 Portsmouth; John H. Ansteth, 1844 Thunderbird, both of Troy, Mich. 48084

[21] Appl. No.: 922,980

[22] Filed: Jul. 10, 1978

[51] Int. Cl.² ............................................. B67D 5/22
[52] U.S. Cl. ................................. 301/36 R; 85/32 R
[58] Field of Search ............... 301/9 R, 13 R, 13 SM, 301/36 R, 36 A, 36 WP, 38 R, 39 R, 39 T, 40 S; 85/32 R

[56] References Cited
U.S. PATENT DOCUMENTS

| | | | |
|---|---|---|---|
| 2,450,507 | 10/1948 | Flogaus | 301/13 R |
| 3,039,825 | 6/1962 | Clark | 301/36 R |
| 3,532,384 | 10/1970 | Williams | 301/36 |

Primary Examiner—H. Grant Skaggs
Attorney, Agent, or Firm—Gifford, Van Ophem, Sheridan & Sprinkle

[57] ABSTRACT

A wheel adapter is provided which enables dual or tandem wheels to be attached to the hub of a vehicle axle which has been designed for a single wheel. The wheel adapter includes an elongated housing having an annular mounting flange at one end and a plurality of axially aligned, circumferentially spaced tubular members at its other end which register with the outwardly protruding studs from the wheel hub. A plurality of nut members threadably engage the studs on the wheel hub to secure one wheel rim to the hub. The other end of each nut member is cylindrical and extends into one of the tubular members while cooperating conical surfaces on the nut member and one end of the tubular members abut together. A bolt extends through the other end of each tubular member and threadably engages a bore in the cylindrical end of the nut member. The bolt and the other end of the tubular member further include cooperating conical surfaces so that upon tightening of the bolt, the cooperating conical surfaces automatically coaxially align the adapter housing with the wheel hub and also rigidly secure the adapter housing onto the wheel hub via the nut members. A second wheel rim is secured in a conventional fashion to an annular mounting flange at the other end of the adapter housing.

9 Claims, 4 Drawing Figures

WHEEL ADAPTER

BACKGROUND OF THE INVENTION

I. Field of the Invention

The present invention relates to an improved wheel adapter of the type for connecting tandem wheels to the hub of a vehicle axle designed for attachment with a single wheel.

II. Description of the Prior Art

There are a plurality of previously known wheel adapters particularly provided for connecting two wheels to the hub of a vehicle axle which has been designed for attachment with a single wheel. One such wheel adapter is disclosed in U.S. Pat. No. 2,635,012 to Rappaport. These previously known wheel adapters, however, suffer several disadvantages and, as a result, have not enjoyed widespread acceptance or use.

One disadvantage of these previously known wheel adapters is that they are constructed of cast iron and consequently are relatively expensive to construct. Moreover, cast iron is brittle and can fracture upon a sharp impact thus presenting a serious safety hazard.

Another disadvantage of these previously known wheel adapters is that a single set of connectors is employed to simultaneously secure both wheel rims to the hub of the vehicle axle. Consequently, with these previously known wheel adapters removal of the outer wheel will cause a loosening between the adapter and the inner wheel and could cause a loosening of the bolts which hold the inner wheel to the hub.

A still further disadvantage of these previously known wheel adapters is that it is difficult, if not altogether impossible, to accurately coaxially align both wheel rims to each other and with respect to the wheel hub. The inability to accurately align the wheel rims results primarily from the clearance fit between the wheel adapter, the axle hub and the individual wheel rims. Such a clearance fit is necessary to facilitate installation of the wheel rims and the wheel adapter. Misalignment of the wheels disadvantageously results in tire run-out, uneven tire wear and overall excessive wear and deterioration of the wheels.

These previously known wheel adapters are also disadvantageous in that they have been unable to achieve the required rigidity between the wheels necessary to maintain parallelism between the planes of the wheels. This is caused by the slip fit provided between the adapter and the extension bolts and also by reason of the adapter being mounted directly against the inner wheel where there is no provision for accurately locating the adapter with respect to the wheel. This also creates wear between the adapter and the inner wheel and thereby increases the problem of maintaining rigidity and parallelism between the wheels. This lack of parallelism results in wheel wobble, particularly at higher speeds. Moreover, wheel wobble not only causes excessive noise and uneven wheel wear but also results in unstable operation of the vehicle.

SUMMARY OF THE PRESENT INVENTION

The present invention overcomes the above mentioned disadvantages of the previously known wheel adapters by providing such an adapter which both accurately coaxially aligns the wheels and maintains wheel parallelism.

In brief, the wheel adapter according to the present invention comprises an elongated housing having an annular mounting flange secured at one end and a plurality of circumferentially spaced and axially aligned tubular members secured to its other end. The tubular members are spaced and positioned in such a manner that they register with the outwardly protruding studs from a conventional wheel hub of a vehicle axle.

With one wheel rim positioned on the hub mounting studs, a lug nut with an inner and outer taper threadably engages each stud to secure the inner wheel rim onto the wheel hub. The tapered nose of the lug nut abuts against a like tapered surface conventionally provided around the wheel rim mounting holes in order to center the inner rim coaxially onto the wheel hub.

The outwardly extending end of each lug nut tapers conically inwardly to an outwardly extending cylindrical portion. The adapter housing is then positioned onto the double tapered nuts so that the cylindrical portion of each lug nut is positioned within the interior of one of the tubular members. In doing so, the lug nut conical surface abuts against a like conical surface on the tubular member. The adapter housing is, therefore, mounted directly against the double tapered lug nuts and does not contact the inner wheel.

A bolt is then positioned through the other end of each tubular member and threadably engages an axially threaded bore in each lug nut. The bolt includes a conically tapered surface which also abuts against a like surface at the other end of the tubular member. Thus, upon tightening the bolts, the adapter housing is automatically brought into axial alignment with the vehicle axle hub due to the coacting conical surfaces and despite the clearance fit between the lug nut cylindrical portions and the tubular members.

The outer wheel rim is connected to an annular flange at the free end of the adapter housing by standard automotive wheel studs and nuts having conventional tapered noses. The outer wheel rim can thus be removed from the wheel adapter without interfering with the connection between the inner wheel rim, the wheel adapter and the hub.

The manner of mounting the wheels and the adapter housing and the wheel hub permits accurate machining of the locating surfaces between the studs and the surfaces engaged by the nut to thereby insure concentricity and maintenance of parallelism between the wheels.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
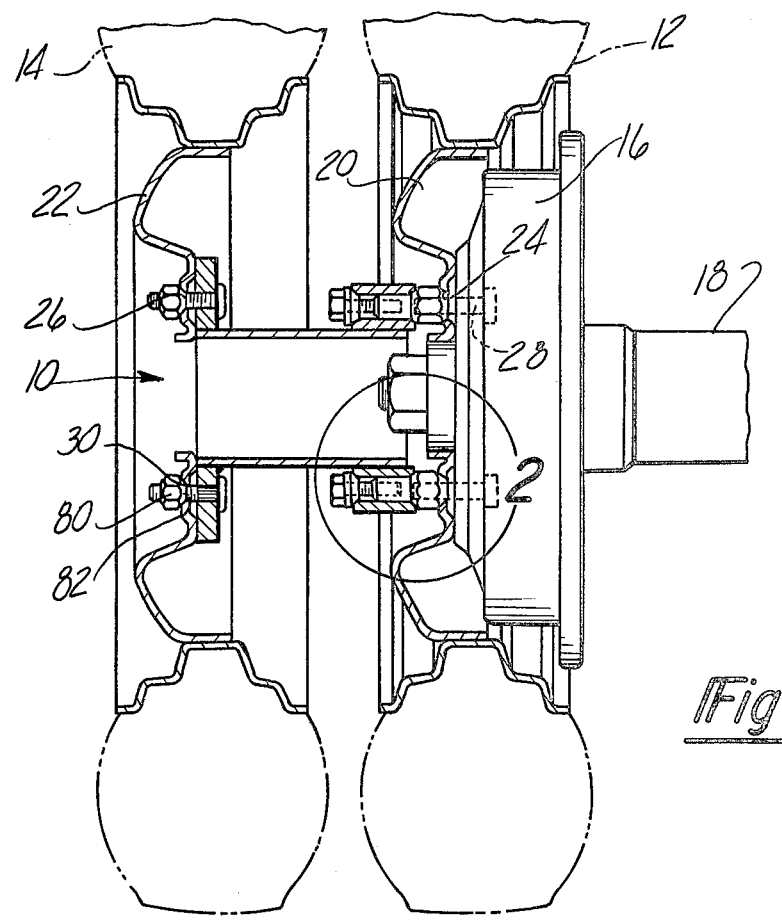
FIG. 1 is a longitudinal cross-sectional view illustrating the wheel adapter according to the present invention.

With reference first to FIG. 1, the wheel adapter 10 of the present invention is thereshown securing an inner wheel 12 and an outer wheel 14 to a hub 16 of a vehicle axle 18 in a manner which will subsequently be described in greater detail. Each wheel 12 and 14 includes a substantially identical rim 20 and 22, respectively, with a plurality of circumferentially spaced mounting holes 24 and 26, respectively, formed therethrough. The mounting holes 24 and 26 are spaced so that they register with conventional mounting studs 28 which extend axially outwardly from the wheel hub 16. In the conventional fashion, the mounting holes 24 and 26 are also larger in diameter than the mounting studs 28 and each mounting hole 24 or 26 flares outwardly to form an annular conical surface 30 (FIG. 2).

Figure 2:
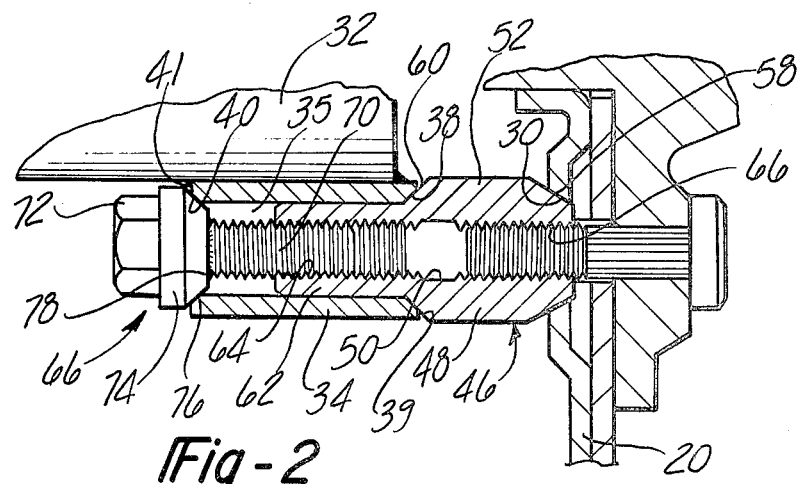
FIG. 2 is a fragmentary sectional view of circle 2 in FIG. 1 and enlarged for clarity.

With reference to FIGS. 1-4, the wheel adapter 10 according to the present invention comprises an elongated cylindrical and tubular housing 32 constructed of a rigid and strong material, for example, steel. A plurality of tubular and cylindrical members 34 defining a cylindrical interior 35 are secured at one end and to the outer periphery of the housing 32 by welds 36 (FIG. 3) or other suitable means. Each tubular member 34 is attached to the housing so that its longitudinal axis is parallel to the axis of the housing 32 and the tubular members are circumferentially spaced about the housing 32 so that one tubular member 34 registers with each of the mounting studs 28 on the wheel hub 16. Moreover, as is best shown in FIG. 2, each end of the tubular member 34 is beveled or tapered inwardly thus forming a conical surface 38 at the outer end 39 of the member 34 with respect to the housing 32 and a further conical surface 40 at the opposite end 41 of the tubular member 34.

Figure 3:
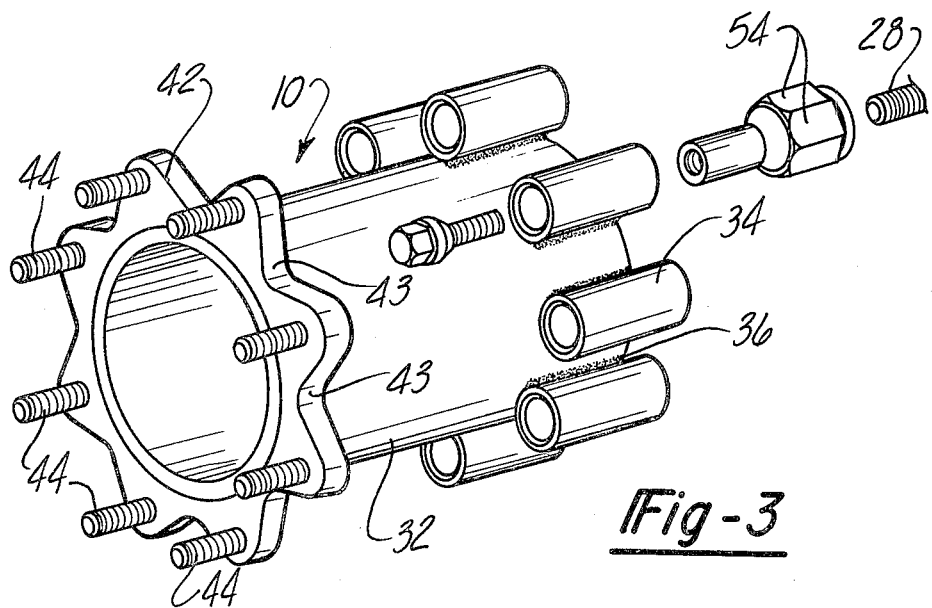
FIG. 3 is an exploded perspective view illustrating the wheel adapter according to the present invention.
Figure 4:
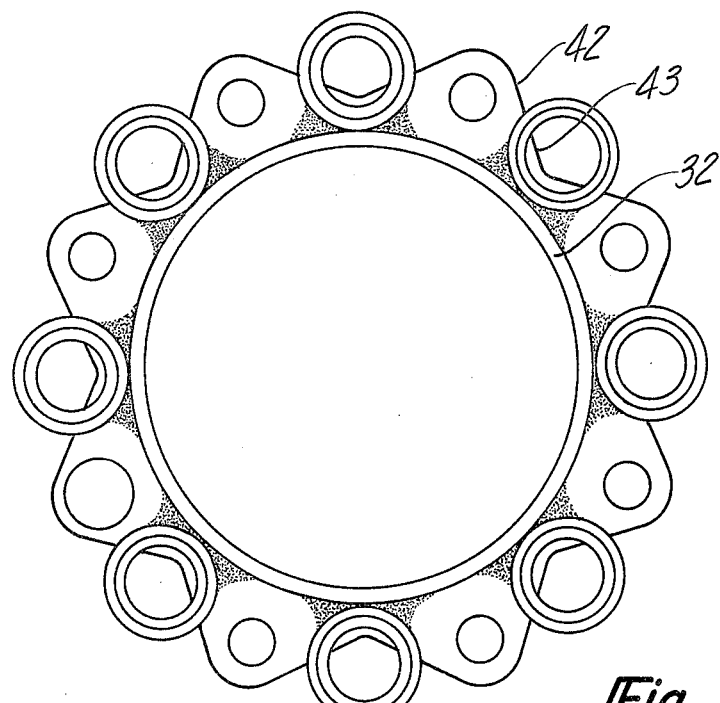
FIG. 4 is an axial plan view illustrating the wheel adapter according to the present invention.

With reference to FIGS. 3 and 4, a mounting flange 42 is secured by appropriate means, such as welding, to the outer end of the housing 32 so that the plane of the mounting flange 42 is parallel to the outer ends 39 of the tubular members 34. A plurality of conventional automotive wheel studs 44 are secured by appropriate means, such as a press fit, to the flange 42 so that the studs 44 are parallel to the axis of the housing 32. In addition, the studs 44 are both circumferentially spaced about the flange 42 so that they register with the mounting holes 26 of the outer wheel rim 22 and also angularly spaced from the tubular members 34 so that the studs 44 are substantially centrally positioned between the angularly adjacent tubular members 34. A V-shaped notch 43 is preferably formed in the flange 42 between each pair of studs 44 in order to provide axial access to the inner ends 41 of the tubular members 34 for a reason to become shortly apparent.

With reference particularly to FIGS. 2 and 3, a special double tapered lug nut 46 is thereshown having an elongated body 48 and an axial throughbore 50. The nut body 48 is enlarged at one end 52 and has polygonal faces 54 formed thereabout for engagement with a suitable sized wrench. Each axial end of the enlarged diameter portion 52 is beveled inwardly thus forming a first conical surface 58 at one free end of the nut 46 and a second conical surface 60 substantially centrally about the nut body 48.

The other end 62 of the lug nut 46 is tubular and cylindrical in shape and has an outside diameter substantially the same or slightly less than the internal bore of the tubular member 34. This tubular cylindrical portion 62 is internally threaded at 64 while the opposite end of the throughbore 50 is oppositely threaded at 66.

Still referring to FIG. 2, a bolt 66 is provided having a threaded shank 70 and a hexagonal bolt head 72. An annulus 74 having a beveled surface 76 at one axial end is secured at 78 by silver solder, welds or other conventional means along the shank 70 so that concentricity between the annulus 74 and shank 70 is maintained. Alternatively, however, the annulus 74 and bolt 66 can be of one-piece construction with the annulus 74, for example, formed adjacent the bolt head 72.

With reference particularly to FIGS. 1 and 2, the wheel adapter 10 according to the present invention is installed upon the hub 16 of the vehicle axis 18 in the following fashion. First, the inner wheel rim 20 is positioned onto the wheel hub 16 so that the studs 28 extend through the rim mounting holes 30. Thereafter, the enlarged head portion 52 of the lug nut 46 is screwed onto the outwardly extending studs 28 so that the conical surfaces 30 and 58 flatly abut against each other. Upon tightening of the lug nuts 46, the cooperation of the conical surfaces 30 and 58 automatically centers the inner wheel rim 20 with respect to the hub axis.

The housing 32 of the wheel adapter 10 is then positioned over and onto the lug nuts 46 so that the outwardly extending cylindrical portion 62 of each lug nut 46 is received within the interior 35 of one of the tubular members 34. The inner end of the housing 32 contacts only the lug nuts 46 and does not directly contact the inner wheel 12 or the inner wheel rim 20. One bolt 66 is then inserted through the inner end 41 of each tubular member 34 and is screwed onto the threaded bore 64 of the nut 46 until the conical surfaces 40 and 76, and 38 and 60, respectively, flatly abut together. The V-shaped notches 43 in the flange 42 enable the bolt heads 72 to be reached axially by an extension wrench.

Upon tightening of the bolts 66, the coaction between the conical surfaces 60 and 38, and 40 and 76, respectively, simply but effectively and automatically coaxially aligns the adapter housing 32 with the axis of the wheel hub 16 despite any clearance fit between the nut cylindrical portion 62 and the tubular member 34. Moreover, the connection of the housing 32 to the nut 46 is extremely rigid and strong since the tubular member is wedged between the conical surface 76 of the annulus 74, secured to the bolt 66, and the conical surface 60 of the nut 46.

Finally, the outer wheel rim 22 is positioned on the outermost end of the wheel adapter 10 so that the studs 44 extend through the wheel rim mounting holes 26. Conventional automotive lug nuts 80, (FIG. 1) having a beveled conical surface 82, threadably engage the studs 44 to not only attach the wheel rim 22 to the wheel adapter 10 but also to automatically coaxially align the outer wheel 14 with the inner wheel 12 due to the coaction between the beveled surface 82 on the nut 80 and surface 30 on the wheel rim mounting hole 26.

From the foregoing, it can be seen that the coacting beveled surfaces on the nut 46, bolt 66 and the tubular member 34 simply, but effectively, rigidly secures the wheel adapter to and automatically coaxially aligns the adapter 10 with the axis of the wheel hub 16 despite clearance fits. This novel attachment ensures the maintenance of parallelism and concentricity between the wheels and thus eliminates run-out and wobble common to the previously known wheel adapters.

The wheel adapter 10 according to the present invention is further advantageous in that it is relatively inexpensive to construct, particularly in comparison with the previously known cast wheel adapters. Furthermore, the outer wheel 14 can be removed from the adapter 10 without loosening or effecting the attachment of the inner wheel 12 to the vehicle hub 16.

Having described our invention, however, many modifications thereto will become apparent to those skilled in the art to which it pertains without deviation from the spirit of the invention as defined by the scope of the appended claims.

We claim:

1. For use in combination with a vehicle having an axle with a hub at at least one axial end, said hub having an axis of rotation, said hub having a plurality of axially outwardly extending circumferentially spaced threaded studs for attaching a wheel to the hub, a wheel adapter for securing two substantially identical wheel rims to one hub, each wheel rim having a plurality of mounting holes formed therethrough and which register with the threaded studs, said adapter comprising:

an elongated housing;
   first means for securing one wheel rim onto the outwardly extending threaded studs, said first means including means for coaxially aligning said wheel rim with the axis of rotation of said hub;
   second means for securing one axial end of said housing to said first means, said second means including means for coaxially aligning said housing with the axis of rotation of said hub;
   third means for securing a second wheel rim to the other axial end of said elongated housing, said third means including means for coaxially aligning said second wheel rim with the axis of rotation of said hub,
   said first wheel rim being positioned over said outwardly extending studs and said first means further comprising a plurality of nuts, each nut being adapted to threadably engage one of said threaded studs to thereby secure said first wheel rim to said hub, each nut having a tapered nose which cooperates with a like tapered surface formed around each mounting hole of the wheel rim to thereby coaxially align said first wheel rim with said hub axis upon tightening of said nuts, each of said nuts including an outwardly extending cylindrical portion which is axially slidably received within a first end of a tubular member secured to the first mentioned axial end of said housing, and
   said second means comprising a plurality of bolts, each bolt being insertable through a second end of each tubular member, each of said bolts threadably engaging a threaded bore in the cylindrical portion of each nut to thereby secure said housing to said nut.

2. The invention as defined in claim 1, wherein each nut includes an axially aligned conical surface which abuts against a like formed conical surface at the first end of the tubular member and wherein said bolt includes an axially aligned conical surface which abuts against a like formed surface at the second end of the tubular member so that upon tightening of said bolts, the coaction between the conical surfaces automatically axially aligns said housing with said wheel hub axis.

3. The invention as defined in claim 1, wherein said wheel adapter further comprises an annular flange secured to the second mentioned end of said housing, a plurality of circumferentially spaced and axially outwardly extending studs secured to said flange so that said studs register with the mounting holes in the second wheel rim, and wherein said third means comprises a plurality of nut members, each nut member threadably engaging one of said last mentioned outwardly extending threaded studs to thereby secure said second wheel rim onto said annular flange.

4. The invention as defined in claim 3, and including a V-shaped notch in said annular flange between each adjacent pair of said last mentioned threaded studs, each of said V-shaped notches being in axial alignment with said first and second means to thereby provide axial access to said first and second means.

5. The invention as defined in claim 1, wherein said housing is tubular and cylindrical in shape and wherein said tubular members are secured to the outer periphery of said housing adjacent the first mentioned end of said housing.

6. The invention as defined in claim 5 wherein said tubular members are welded to the outer periphery of said housing.

7. For use in conjunction with a vehicle having an axle with a hub at at least one axial end, said hub having a plurality of axially outwardly extending circumferentially spaced threaded studs for attaching a wheel to the hub, a wheel adapter for securing a first and second substantially identical wheel rim to one hub, each wheel rim having a plurality of mounting holes formed therethrough and having the same spacing as the threaded studs, said adapter comprising:

an elongated housing;
   nut members for threadably engaging said studs to thereby secure said first wheel rim onto the hub, said first wheel rim being positioned between said nut members and said hub, said nut members having a conically tapered portion on their outwardly extending end;
   said housing having a plurality of tubular members longitudinally secured to said housing and adjacent one end thereof, said tubular members being circumferentially spaced so that a first end of each tubular member registers with the outwardly extending end of one nut member, said first end of each of said tubular portions having a conically tapered surface which mates with the conically tapered portion on said nut member;
   bolt members for securing said housing to said nut members, each bolt member extending through a second end of one tubular member and threadably engaging an internally threaded bore in the nut member, each bolt member having a conically tapered portion which abuts against a like tapered portion at the second end of the tubular member; and
   means for attaching the other wheel rim to the other end of the housing.

8. For use in combination with a vehicle having an axle with a hub at at least one axial end, said hub having an axis of rotation, said hub having a plurality of axially outwardly extending circumferentially spaced threaded studs for attaching a wheel to the hub, a wheel adapter for securing two substantially identical wheel rims to one hub, each wheel rim having a plurality of mounting holes formed therethrough and which register with the threaded studs, said wheel adapter comprising:

an elongated housing having a first axial end and a second axial end, said housing having a plurality of tubular members at said first axial end;
   a plurality of nuts, each nut being adapted to threadably engage one of said threaded studs to thereby secure said first wheel rim to said hub, each nut including an outwardly extending cylindrical portion, said cylindrical portion being axially, slidably receivable in a first end of one of said plurality of tubular members;

a plurality of bolts, each bolt being insertable through a second end of each tubular member, each of said bolts threadably engaging a threaded bore in said cylindrical bore of each nut to thereby secure said housing to said nut; and means for securing a second wheel rim to said second axial end of said housing, said securing means including means for coaxially aligning said second wheel rim with the axis of rotation of said hub.

9. For use in combination with a vehicle having an axle with a hub at at least one axial end, said hub having an axis of rotation, said hub having a plurality of axially outwardly extending circumferentially spaced threaded studs for attaching a wheel to the hub, a wheel adapter for securing two substantially identical wheel rims to one hub, each wheel rim having a plurality of mounting holes formed therethrough and which register with the threaded studs, said adapter comprising:

an elongated housing;

first means for securing one wheel rim onto the outwardly extending threaded studs, said first means including means for coaxially aligning said wheel rim with the axis of rotation of said hub;

second means for securing one axial end of said housing to said first means, said second means including means for coaxially aligning said housing with the axis of rotation of said hub;

third means for securing a second wheel rim to the other axial end of said elongated housing, said third means including means for coaxially aligning said second wheel rim with the axis of rotation of said hub, said wheel adapter further comprising an annular flange secured to the second mentioned end of said housing, a plurality of circumferentially spaced and axially outwardly extending studs secured to said flange so that said studs register with the mounting holes in the second wheel rim, said third means comprising a plurality of nuts, each nut threadably engaging one of said last mentioned outwardly extending threaded studs to thereby secure said second wheel rim onto said annular flange, and said annular flange having a V-shaped notch between each adjacent pair of said last mentioned threaded studs, each of said V-shaped notches being in axial alignment with said first and second means to thereby provide axial access to said first and second means.

* * * * *